Figure 1A:
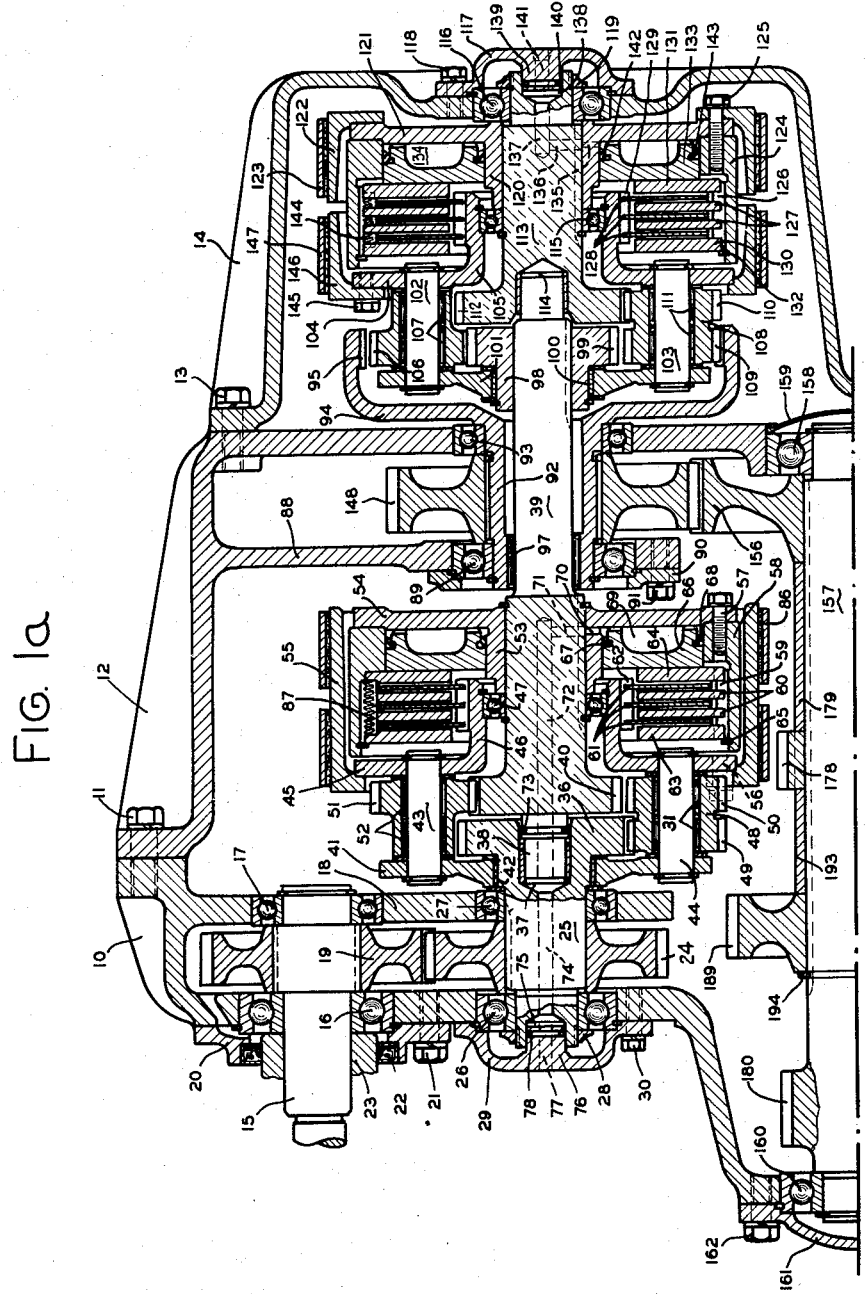

Sept. 28, 1954 C. A. COOK ET AL 2,690,086
TRANSMISSION
Filed Aug. 21, 1951 3 Sheets-Sheet 1

INVENTORS.
CHARLES A. COOK
ERNEST E. EATON
BY
ATTYS.

Sept. 28, 1954   C. A. COOK ET AL   2,690,086
TRANSMISSION
Filed Aug. 21, 1951   3 Sheets-Sheet 2

INVENTORS.
CHARLES A. COOK
ERNEST E. EATON
BY
ATTYS.

Sept. 28, 1954　　C. A. COOK ET AL　　2,690,086
TRANSMISSION

Filed Aug. 21, 1951　　　　　　　　　　3 Sheets-Sheet 3

INVENTORS.
CHARLES A. COOK
ERNEST E. EATON
BY
ATTYS.

Patented Sept. 28, 1954

2,690,086

UNITED STATES PATENT OFFICE 2,690,086

TRANSMISSION

Charles A. Cook and Ernest E. Eaton, Jackson, Mich., assignors to Clark Equipment Company, Buchanan, Mich., a corporation of Michigan Application August 21, 1951, Serial No. 242,826

9 Claims. (Cl. 74—740)

Our present invention relates generally to a transmission, and, more specifically, is directed to a transmission for self propelled vehicles, as for example, road graders, tractors, and the like.

It is a primary object of our present invention to provide a multi-speed transmission having an input shaft and an output shaft the axes of which lie in the same vertical plane and the ends of which shafts extend outwardly of the housing of the transmission at the same end thereof.

It is another object of our present invention to provide a transmission, of the character noted, which is of minimum axial extent.

It is a further object of our present invention to provide a transmission, as described, which may be readily assembled and disassembled.

In the accomplishment of the above objects, we propose to preferably provide a transmission housing comprising a forward portion, an intermediate portion, and a rear portion with the forward and rear portions being detachably secured to the intermediate portion at opposite ends thereof. An input shaft extends into the forward housing portion and a first shaft lying below the input shaft extends through the forward housing portion and into the intermediate housing portion. Gear means is provided between the input shaft and the first shaft and the gear means lies within the confines of the forward housing portion. A second shaft is aligned coaxially of the first shaft and extends between the intermediate and rear housing portions. Selectively operable forward and reverse drive gear means is arranged between the first and second shafts and the gear means lies substantially within the confines of the intermediate housing portion. A third shaft is disposed below the second shaft and extends through the forward and intermediate housing portions. Selectively operable change speed gear means is provided between the second and third shafts and the gear means lies substantially within the confines of the rear housing portion. An output shaft is mounted below the third shaft and extends through the forward and intermediate housing portions. A bevel drive pinion is mounted on the end of the output shaft outwardly of the forward housing portion below the input shaft. Selectively operable change speed gear means are provided between the third shaft and the output shaft within the confines of the forward and intermediate housing portions.

It is still another object of our invention to provide a transmission of the character described wherein the gear means between the first and second shafts comprises planetary gear means.

It is a still further object of our invention to provide a transmission as noted wherein the gear means between the third shaft and the output shaft includes a pair of axially shiftable clutch collar members.

A feature of our invention resides in the character of the gear means between the second and third shafts. The gear means includes a sleeve member journaled about the second shaft. A gear is fixed to the sleeve member intermediate of the ends thereof, which gear has meshing engagement with a gear fixed to the third shaft. Planetary gear means is provided between the adjacent ends of the second shaft and the sleeve member within the confines of the gear housing portion. The planetary gear means comprises five elements, namely, a sun gear, planet pinion means, a planet carrier, a ring gear, and a reaction gear. One of the elements has driving connection with the second shaft and another of the elements has driving connection with the sleeve member. First means is provided for clutching two of the planetary elements together whereby one drive ratio is effected between the second shaft and the sleeve member. Second means is provided for braking one of the planetary elements whereby a second drive ratio is effected between the second shaft and the sleeve member. Third means is provided for braking another of the planetary elements whereby a third drive ratio is effected between the second shaft and the sleeve member.

In the preferred embodiment of our invention to be disclosed in detail hereinafter, the planetary ring gear is formed at the end of the sleeve member and the sun gear is fixed to the end of the second shaft. The first means is adapted to clutch the planet carrier and the reaction gear together while the second means is adapted to brake the planet carrier against rotation. The third means provides for braking of the reaction gear.

The aforedescribed planetary gear means provides for a compact change speed gear assembly as will be recognized by those skilled in the art. Instead of the drive proceeding in a straight line between a pair of shafts lying in end to end relation as is conventional, the drive "doublesback" or the input and output of the planetary gear means extends from the same side of the latter, thus maintaining the axial extent of the planetary gears means, as well as the overall axial extent of the transmission, at a minimum.

Now, in order to acquaint those skilled in the art with the manner of constructing and using the transmission of our present invention, we shall describe in connection with the accompanying drawings a preferred embodiment of our present invention.

Figure 1B:
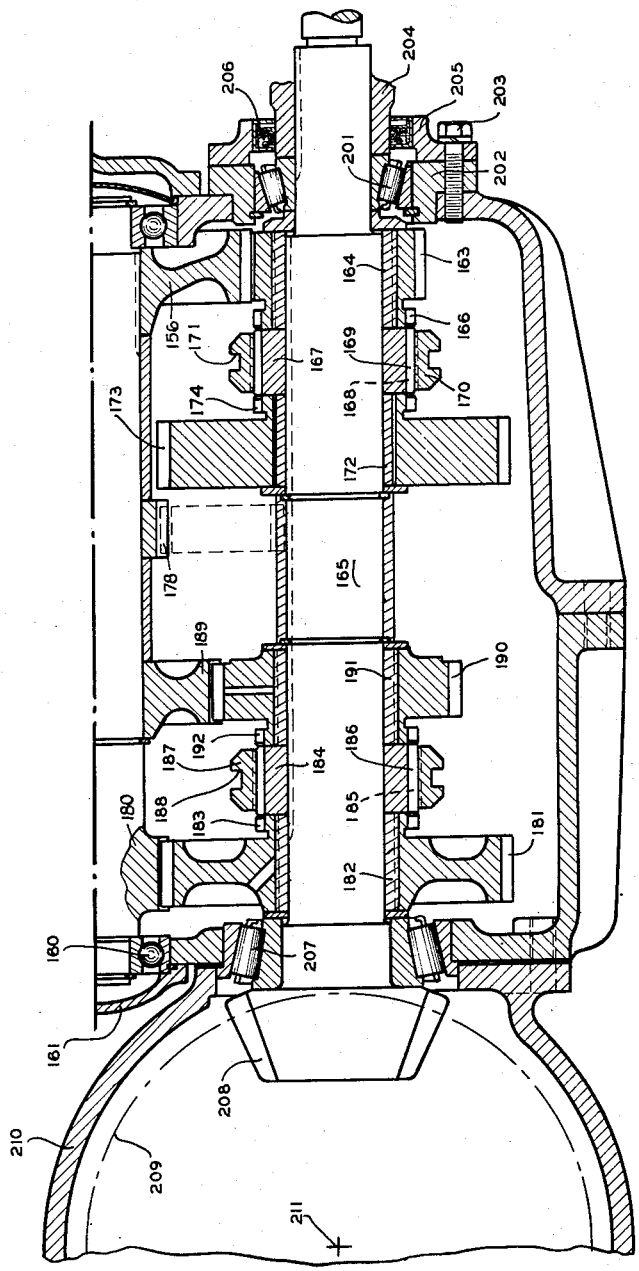
Figure 2:
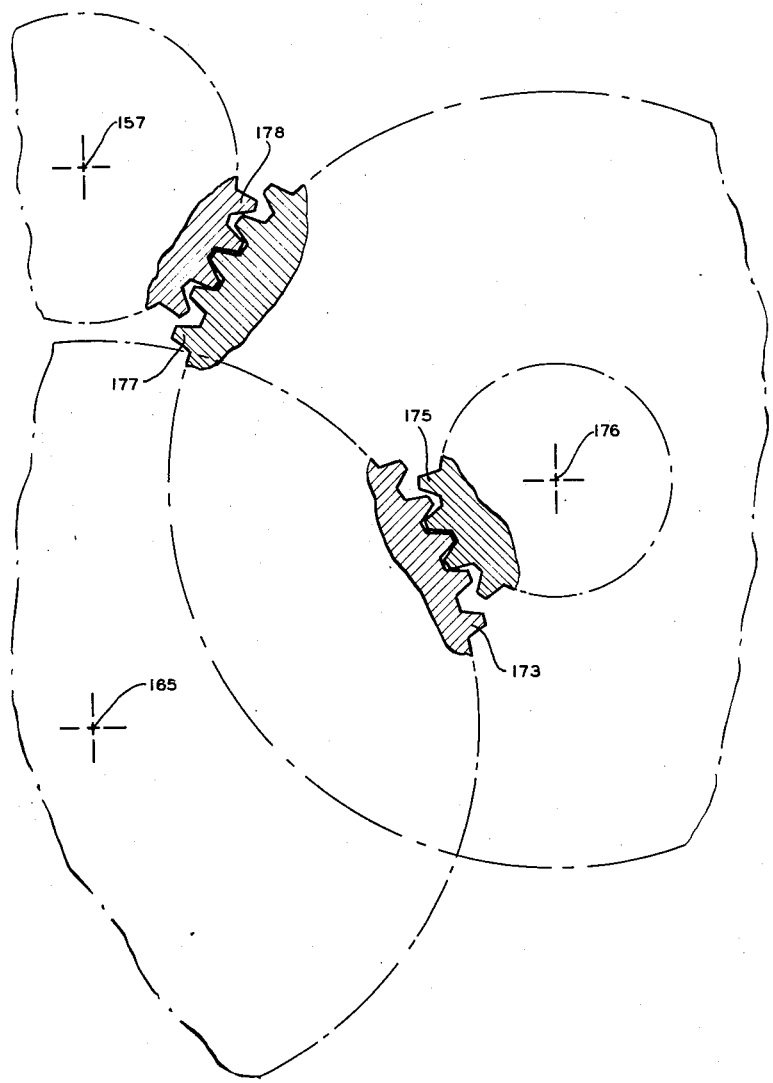

In the drawings:

Figures 1a and 1b when aligned along the dot-dash lines illustrate a vertical sectional view taken through the transmission of our present invention; and Figure 2 is a diagrammatic showing of the low speed gear means associated with the output shaft of the transmission of Figure 1.

Referring now to the drawings, there is shown a transmission housing comprising a forward portion 10 suitably secured by circumferentially spaced bolts 11 to the forward end of an intermediate portion 12 which in turn is secured at its rear end by a plurality of circumferentially spaced bolts 13 to a rear portion 14. A horizontally extending input shaft 15 is rotatably mounted in a ball bearing assembly 16 retained in the forward radial wall of the forward transmission housing portion 10. The shaft 15 is adapted to have driving connection with a prime mover (not shown). The input shaft 15 at its rear end is journaled in a ball bearing assembly 17 which is retained in the radially inwardly directed flange portion or wall 18 of the forward transmission housing portion 10. A gear 19 is splined or otherwise suitably secured to the shaft 15 intermediate of the ball bearing assemblies 16 and 17. A cap member 20 is disposed concentrically about the shaft 15 and is secured to the forward wall of the forward transmission housing portion 10 by circumferentially spaced bolts 21. An annular oil seal 22 is arranged between the inner periphery of the cap member 20 and the outer periphery of a hub member 23 mounted on the input shaft 15 outwardly of the transmission housing.

The gear 19 has meshing engagement with a gear 24, splined or otherwise suitably secured to a shaft 25, which shaft 25, lies below the shaft 15, and at its forward end, is journaled in a ball bearing assembly 26 suitably retained in the forward wall of the forward transmission housing portion 10. The axis of shaft 25 lies in the vertical plane passing through the axis of the input shaft 15. The shaft 25 is also journaled in a ball bearing assembly 27 mounted in the radial flange 18 of the forward transmission housing portion 10. A lock nut 28 is threaded on to the end of the shaft 25 for retaining the ball bearing assembly 26 and gear 25 in proper position. A cap member 29 is disposed about the end of the shaft 25 and is secured to the forward wall of the forward transmission housing portion 10 by circumferentially spaced bolts 30.

A gear portion 36 is formed integrally with the shaft 25 at the rear end thereof. A central axial opening 37 is formed in the rear end of the shaft 25 and piloted therein is the forward nose portion 38 of a rearwardly extending shaft 39. A gear portion 40 is formed integrally with the shaft 39 closely adjacent to the gear 36.

A radial ring member 41 at its inner periphery is journaled on an annular bushing member 42 supported on the shaft 25 intermediate of the ball bearing assembly 27 and the gear 36. A first set of circumferentially spaced axially rearwardly extending pin members 43 are fixed at their forward ends in the ring member 41. A second set of circumferentially spaced axially rearwardly extending pin members 44 are fixed at their forward ends in the ring member 41. The pin members 43 and 44 are arranged alternately and, at their rear ends, are fixed in the radially extending flange portion 45 of an axially rearwardly extending inner clutch hub 46, which hub 46 is journaled on a ball bearing assembly 47 suitably mounted on the outer periphery of the shaft 39 intermediate of the ends thereof. The ring member 41 and flange 45 serve as a planet carrier. Compound planet pinions 48 having pinion portions 49 and 50 are rotatably mounted on needle bearing assemblies 51 arranged about the outer periphery of the pin members 44. The gear portions 49 of the compound pinions 48 have meshing engagement with the gear 36 of shaft 25.

Planet pinions 51 are rotatably mounted on needle bearing assemblies 52 arranged about the outer periphery of the pin members 43. The pinions 51 have meshing engagement with the pinion portions 50 of the compound planet pinions 48 and the gear 40 of the shaft 39.

Secured to the radial flange 45 of the inner clutch hub 46, at the outer periphery thereof, is an annular axially rearwardly extending brake drum 55. The brake drum 55 is secured to the radial flange 45 by circumferentially spaced bolts 56.

Splined on the shaft 39, immediately rearwardly of the ball bearing assembly 47 and within the confines of the brake drum 55, is a hub member 53, which at its rear end is formed with a radially extending flange portion 54. Disposed within the confines of the brake drum 55 and secured at its rear end, to the radial flange 54, at the outer periphery thereof, by bolts 57, is an outer clutch hub 58 which has internal straight splines 59. Mounted for axial movement along the splines 59 are radially extending clutch discs 60. Arranged alternately with respect to the clutch discs 60 are clutch discs 61 which are mounted for axial movement on external straight splines 62 formed in the aforedescribed inner clutch hub 46. Suitable plate members 63 and 64 are disposed on each side of the sets of clutch plates 60 and 61. Axial movement of the plate member 63 to the left as viewed in Figure 1 is limited by a snap ring 65 which is fixed in the outer clutch hub 58.

Bearing against the rear radial surface of the rear clutch plate 64 is a piston 66 which at its inner periphery engages the hub 53 and at its outer periphery engages the outer clutch hub 58. The piston 66 is provided with oil seals 67 and 68 for preventing leakage of the fluid therepast. The piston 66 is hollowed out whereby a fluid chamber 69 is defined between the piston 66 and the radial flange 54 of hub 53. The fluid chamber 69 communicates through a radial fluid passageway 70 formed in the hub member 53 which fluid passageway 70, in turn, communicates with a radial fluid passageway 71 formed in the shaft 39. The fluid passageway 71 communicates with an axially forwardly extending fluid passageway 72 formed in the shaft 39 and the fluid passageway 72 at its forward end communicates with the aforedescribed opening 37 formed in the rear end of the shaft 25. A suitable oil seal 73 is arranged about the outer periphery of the nose portion 38 of shaft 39 for preventing fluid leakage therepast. The opening 37 communicates with the rear end of an axial fluid passageway 74 formed in the shaft 25 which passageway 74 at its forward end communicates with an opening 75 formed in the forward end of the shaft 25. The aforedescribed cap member 29 secured about the end of the shaft 25 is formed with a rearwardly extending nose portion 76 which is journaled in the opening 75 in the shaft 25. An axial fluid passageway 77 is formed in the cap member 29 and at one end communicates with the opening 75 in shaft 25 and at the other end is adapted to be selectively placed in communication with a source of fluid under pressure. A suitable oil seal 78 is provided about the outer periphery of the nose portion 76 of the cap member 29 for preventing leakage of fluid therepast.

Upon the selective admission of fluid under pressure to the fluid chamber 69 at the rear end of the piston 66, through the fluid passageway 77, opening 75, passageway 74, opening 37, and fluid passageways 72, 71 and 70, the piston 66 is urged to the left from the position shown in Figure 1 until the clutch discs 60 and 61 are forced together. When the clutch discs 60 and 61 are fully engaged the inner clutch hub 46 is clutched to the shaft 39 for conjoint rotation therewith. It is to be also observed that when the hub 46 is clutched to the shaft 46, the planet pinions 51 are held against rotation relative to the gear 40 which in turn prevents relative rotation of the compound planet pinions 48 and the gear 36 relative to the shaft 39. Thus direct drive is effected between the shafts 25 and 39.

One or more brake bands 86 which in the specific embodiment shown herein number two, are disposed about the outer periphery of the brake drum 55. Any suitable actuating mechanism (not shown) may be provided for applying the brake bands 86 to the brake drum 55 for braking the latter. Assuming that the fluid has been bled from the chamber 69, adjacent the piston 66, and the clutch discs 60 and 61 are spread apart, as is effected by means of the axially extending coil springs 87 arranged between the clutch plates 63 and 64, reverse drive to the shaft 39 may be effected by selectively applying the brake bands 86 to the brake drum 55. When the brake drum 55 is held against rotation, the pin members 43 and 44 carried by the planet carrier are held against rotation and thus the planet pinions 49, 50 and 51 are free to rotate about the pin members 43 and 44.

Assuming that the gear 36 is rotating in a counterclockwise direction, it will be observed that the planet pinion portions 39 of the compound planet pinions 48 will rotate in a clockwise direction as will the planet pinion portions 50 of the compound planet pinions 48. The planet pinions 51 will, in turn, rotate in a counterclockwise direction and the gear 40 and shaft 39 will be rotated in a clockwise direction, which is in the opposite direction of rotation of the gear 36.

It will thus be seen from the above description that direct forward drive may be effected between the shafts 25 and 39 by causing engagement of the clutch discs 60 and 61, while reverse drive may be effected between the shafts 25 and 39 by releasing engagement of the clutch discs 60 and 61 and applying the brake bands 86 to the brake drum 55.

The intermediate transmission portion 12 is formed with a radially inwardly extending flange or wall 88 in which is mounted a ball bearing assembly 89. The ball bearing assembly 89 is maintained in position by means of a ring member 90 suitably secured to the flange 88 by circumferentially spaced bolts 91. Journaled in the ball bearing assembly 89 is the forward end of an axially rearwardly extending sleeve member 92, which, at its rear end, is journaled in a ball bearing assembly 93 suitably mounted in the rear end wall of the intermediate transmission housing portion 12. The sleeve member 92 immediately rearwardly of the ball bearing assembly 93, within the rear transmission housing portion 14, is formed with a radially extending flange portion 94, which flange portion 94, at its outer periphery is formed over so as to extend axially rearwardly. The axially extending portion of the flange 94 is formed with internal gear teeth 95 which serve as a ring gear.

A needle bearing assembly 97 is arranged about the inner periphery of the sleeve member 92, at the forward end thereof, and provides a support for the shaft 39 intermediate of the ends thereof.

The hub 98 of a gear 99 is splined or otherwise suitably secured to the shaft 39, adjacent the rear end thereof substantially within the confines of the axially rearwardly extending portion of the flange 94 of sleeve 92. A bushing member 100 is mounted on the outer periphery of the hub 98 and journaled on the bushing member 100 is a radially extending ring member 101 in which is secured the forward ends of a plurality of circumferentially spaced axially extending pin members 102. Also fixed at their forward ends in the ring member 101 are circumferentially spaced axially extending pin members 103. The pin members 102 and 103 are alternately arranged and at their rear ends are fixed in the radial flange portion 104 of an inner clutch hub 105. The ring member 101 and flange 104 serve as a planet carrier. Planet pinions 106 are rotatably mounted on needle bearing assemblies 107 arranged concentrically about the pin members 102. The planet pinions 106 have meshing engagement with the aforedescribed gear 99 secured to the shaft 39. Compound planet pinions 108 having planet pinion portions 109 and 110 are journaled on needle bearing assemblies 111 arranged about the pin members 103. The planet pinion portions 109 of the compound planet pinions 108 have meshing engagement with the ring gear 95 and the planet pinions 106. The planet pinion portions 110 of the compound planet pinions 108 have meshing engagement with a gear 112 formed at the forward end of a rearwardly extending shaft 113. The shaft 113 is aligned coaxially of the shaft 39.

An axially extending opening 114 is formed in the forward end of the shaft 113 and the rear nose portion of shaft 39 is suitably piloted in the opening 114. Mounted about the outer periphery of the shaft 113 intermediate the ends thereof is a ball bearing assembly 115 on the outer periphery of which is mounted the aforedescribed inner clutch hub 105. The shaft 113 adjacent the rear end thereof is journaled in a ball bearing assembly 116 mounted in the rear end wall of the rear transmission housing portion 14. The ball bearing assembly 116 is maintained in position by means of a cap member 117 suitably secured to the rear end wall of the rear transmission housing portion 14 by means of circumferentially spaced bolts 118. The ball bearing assembly 116 is also maintained in axial position by means of a lock nut 119 threaded onto the end of the shaft 113 within the cap member 117.

Suitably splined or otherwise secured to the shaft 113 intermediate of the ball bearing assemblies 115 and 116 is a hub 120 having a radially extending flange portion 121 at the rear end thereof. Secured to the flange 121 at the outer periphery thereof is an axially forwardly extending brake drum 122 about which is disposed a brake band 123. Application of the brake band 123 to the brake drum 122 may be effected by any known and conventional brake actuating means. Also secured to the flange 121 inwardly of the brake drum 122 is an axially forwardly extending outer clutch hub 124. The brake drum 122 and the clutch hub 124 are secured to the flange 121 by means of circumferentially spaced bolts 125. The clutch hub 124 is formed with internal straight splines 126 on which are mounted for axial movement, clutch discs 127. Arranged alternately with respect to the clutch discs 127 are clutch discs 128 which are mounted for axial movement on external straight splines 129 formed on the inner clutch hub 105. Clutch plates 130 and 131 are disposed on each side of the clutch discs 127 and 128. Forward axial movement of the forward clutch plate 130 is limited by a thrust washer 132 mounted in the clutch hub 124.

A piston 133 engages the rear radial surface of the rear clutch plate 131. The inner periphery of the piston 133 engages the outer periphery of the hub 120 and the outer periphery of the piston 133 engages the inner periphery of the outer clutch hub 124. The piston 133 is hollowed out thus defining a fluid chamber 134 between the piston 133 and the flange 121 of the hub member 120. Suitable oil seals 142 and 143 are provided for the piston 133 to prevent leakage of fluid therepast.

The fluid chamber 134 communicates through a radial fluid passageway 135 formed in the hub 120, which fluid passageway 135, in turn, communicates with a radial fluid passageway 136 formed in the shaft 113. The passageway 136 communicates with the forward end of an axially rearwardly extending fluid passageway 137 formed in the shaft 113. The rear end of the fluid passageway 137 communicates with an opening 138 formed in the shaft 113, in which opening 138, a forwardly extending nose portion 139 of the cap member 117 is piloted. A suitable oil seal 140 is disposed about the outer periphery of the nose portion 139 and engages the inner periphery of the opening 138. The opening 138 communicates with a fluid passageway 141 in the cap member 117 which opens outwardly of the cap member 117 and is adapted to be selectively disposed in communication with a source of fluid under pressure.

When fluid under pressure is selectively admitted to the chamber 134, through the fluid passageway 141, opening 138, passageways 137, 136, and 135, the piston 133 is urged to the left from the position shown in Figure 1, thereby forcing the clutch discs 127 and 128 together, which, clutches the inner clutch hub 105 to the outer clutch hub 124. When fluid is bled from the chamber 134 the clutch discs 127 and 128 are spread apart by means of axially extending coil springs 144 which are arranged between the clutch plates 130 and 131.

Secured to the outer periphery of the flange 104 of the inner clutch hub 105, as by a plurality of circumferentially spaced bolts 145, is a brake drum 146 about which is disposed a brake band 147. Any suitable brake actuating means may be provided for selectively disposing the brake band 147 in engagement with the brake drum 146 for braking the latter.

Drive may be selectively effected between the shaft 39 and the sleeve member 92 in one of three ranges. If low range drive is desired the brake band 147 is applied to the brake drum 146 thereby holding the latter, together with the flange 104 and the pin members 102 and 103 against rotation. Assuming that the shaft 39 is rotating in a clockwise direction, the planet pinions 106 will be caused to rotate in a counterclockwise direction, which, in turn, will effect clockwise rotation of the planet pinion portions 109 of the compound planet pinions 108. Clockwise rotation of the planet pinion portions 109 will effect clockwise rotation of the ring gear 95 and the sleeve member 92.

If intermediate drive is desired, the brake band 147 is released from braking engagement with the brake drum 146 and the brake band 123 is applied to the brake drum 122 which, through the flange 121, holds the shaft 113 against rotation. The gear 112 then serves as a reaction gear for the compound planet pinions 108.

If high range drive or direct drive is desired, the brake band 123 is released from engagement with the brake drum 122 and fluid under pressure is selectively admitted to the fluid chamber 134 for effecting engagement of the clutch discs 127 and 128. When the clutch discs 127 and 128 are disposed in engagement, the clutch hubs 105 and 124 rotate conjointly with the shaft 113, which, holds the compound planet pinions 108 against rotation relative to the pin members 103, gear 112 and shaft 113. With the compound planet pinions 108 held against rotation relative to the pin members 103, the planet pinions 106 are held against rotation relative to the gear 99 and thus the elements of the planetary gear mechanisms are locked together and the ring gear 95 rotates conjointly with the shaft 39.

Splined or otherwise suitably secured to the sleeve member 92 intermediate of the radial flange 88 and the rear end wall of the intermediate transmission housing portion 12 is a gear 148 which has meshing engagement with a gear 156 splined on the rear end of a shaft 157. The shaft 157 at its rear end is journaled in a ball bearing assembly 158 suitably mounted in the rear end wall of the intermediate transmission housing portion 12. The rear end of the shaft 157 is closed by a suitable closure plate 159. The shaft 157 adjacent its forward end is journaled in a ball bearing assembly 160 which is secured in the forward wall of the forward transmission housing portion 10. The ball bearing assembly 160 is maintained in position by means of a cap member 161 which is secured to the forward wall of the forward transmission housing portion 10 by means of a plurality of circumferentially spaced bolts 162.

The gear 156 has meshing engagement with a gear 163 which is journaled on a bushing member 164 mounted about the outer periphery of an output shaft 165. The axes of the shafts 157 and 165 are parallel and lie in the vertical plane passing through the axis of the input shaft 15. The hub of the gear 163 is formed with external jaw clutch teeth 166. Secured to the output shaft 165 immediately forwardly of the gear 163 is a hub member 167 having external straight splines 168 which mate with the internal straight splines 169 of an axially shiftable clutch collar member 170. The clutch collar member 170 is formed with an annular groove 171 which is adapted to receive a shift fork (not shown) for effecting axial movement of the clutch hub 170. When the clutch hub 170 is moved to the right from the position shown in Figure 1, the internal splines 169 thereof are disposed in engagement with the external jaw clutch teeth 168 of gear 163 thereby clutching the latter to the shaft 165 for conjoint rotation therewith.

Mounted on the shaft 165, immediately forwardly of the hub member 167, is a bushing member 172 upon which is journaled for rotation a gear 173, the hub of which is formed with external jaw clutch teeth 174. When the clutch collar member 170 is shifted to the left from the position shown in Figure 1, until the internal straight splines 169 are disposed in engagement with the external jaw clutch teeth 174 of gear 173, the latter is clutched to the shaft 165 for conjoint rotation therewith.

As shown in Figure 2, the gear 173 has meshing engagement with a gear 175 shown diagrammatically for the sake of clarity. The gear 175 is mounted on a shaft 176 which is suitably journaled at its ends in ball bearing assemblies (not shown) mounted in the transmission housing. Also mounted on the shaft 176, for rotation therewith, is a gear 177 which has meshing engagement with a gear 178 splined or otherwise suitably secured to the shaft 157 intermediate of the ends thereof. The gears 178 and 156 are axially spaced on the shaft 157 by means of an annular spacing member 179.

Formed integrally with the forward end of the shaft 157 is a gear portion 180 which has meshing engagement with a gear 181 journaled on a bushing member 182 arranged about the outer periphery of the forward end of the output shaft 165. The hub of the gear 181 is formed with external jaw clutch teeth 183. A hub member 184 is keyed, splined, or otherwise suitably secured to the output shaft 165, immediately rearwardly of the gear 181, and the hub 184 is formed with external straight splines 185 which mate with the internal straight splines 186 of an axially shiftable clutch collar member 187. The clutch collar member 187 is formed with an annular groove 188 which is adapted to receive a shift fork (not shown). When the clutch collar member 188 is shifted to the left from the position shown in Figure 1, until the internal splines 186 are disposed in engagement with the jaw clutch teeth 183 of gear 181, the latter is clutched to the output shaft 165 for conjoint rotation therewith.

Also splined to the shaft 157, intermediate of the gears 178 and 180, is a gear 189 which has meshing engagement with a gear 190 journaled on a bushing member 191 supported on the output shaft 165 immediately rearwardly of the hub member 184. The hub of the gear 190 is formed with external jaw clutch teeth 192. When the clutch collar member 187 is shifted to the right, from the position shown in Figure 1, until the internal splines 186 are disposed in engagement with the jaw clutch teeth 192 of gear 190, the latter is clutched to the shaft 165 for conjoint rotation therewith.

The aforedescribed gears 178 and 189 on the shaft 157 are axially spaced by means of an annular spacer member 193, and the gear 189 is maintained in axial position by means of a thrust washer 194 fixed in the shaft 157.

The output shaft 165, at its rear end, is journaled in a tapered roller bearing assembly 201 which is retained in a flange member 202 suitably secured to the rear end wall of the intermediate transmission housing portion 12 by means of a plurality of circumferentially spaced bolts 203. The hub 204 of a conventional output shaft brake (not shown) is suitably secured to the rear end of the output shaft 165. Arranged concentrically about the brake hub 204 is a cap member 205 which is secured to the flange member 202 by the aforedescribed bolts 203. An oil seal assembly 206 is interposed between the inner periphery of the cap member 205 and the outer periphery of the brake hub 204 for preventing oil leakage from the interior of the transmission housing.

The forward end of the output shaft 165 is journaled in a tapered roller bearing assembly 207 which is suitably fixed in the forward end wall of the forward transmission housing portion 10.

A bevel pinion 208 is formed integrally with the forward end of the output shaft 165 forwardly of the tapered roller bearing assembly 207. The bevel pinion 208 is adapted to have meshing engagement with a bevel ring gear shown diagrammatically at 209, which is arranged within a bevel ring gear housing 210 secured to the forward wall of the forward transmission housing portion 10. The bevel ring gear 209 is fixed to a drive axle shown diagrammatically at 211 for effecting rotation of the latter. The drive axle 211 extends at right angles to the output shaft 165.

Drive between the shaft 157 and the output shaft 165 is adapted to be effected in one of four drive ratios. When the clutch collar member 170 is shifted to the left from the position shown in Figure 1, so as to clutch the gear 173 to the output shaft 165, ultra low or first drive ratio is effected between the shafts 157 and 165. When the clutch collar member 170 is returned to a neutral position as shown in Figure 1, and the clutch collar member 187 shifted to the left from the position shown in Figure 1, so as to clutch the gear 181 to the shaft 165, a second drive ratio is effected between the shafts 157 and 165. Third drive ratio is effected by shifting the clutch collar member 187 to the right from the position shown in Figure 1, so as to clutch the gear 190 to the output shaft 165. High ratio drive, or fourth ratio drive, is effected by returning the clutch collar member 187 to the position shown in Figure 1 and then shifting the clutch collar member 170 to the right from the position shown in Figure 1, so as to clutch the gear 163 to the output shaft 165.

As outlined above, either forward drive or reverse drive may be effected selectively between the input shaft 15 and the shaft 39. Any one of three drive ranges may be effected selectively, in either forward or reverse drive, between the shaft 39 and the shaft 157. In addition, any one of four drive ratios may be effected between the shaft 157 and the output shaft 165. It will thus be observed that any one of 12 speed ranges between the input shaft 15 and the output shaft 165 may be selected with the transmission of our present invention.

In actual practice, it is undesirable to drive the output shaft in a reverse direction either in ultra low speed or in high ratio drive, and therefore, when reverse drive is selected, means are generally provided for preventing the clutch collar member 170 from being shifted from the neutral position shown in Figure 1. Thus, in a reverse direction, only six speeds are provided between the input shaft 15 and the output shaft 165.

While we have shown and described what we believe to be a preferred embodiment of our present invention, it will be understood that various modifications and re-arrangements may be made therein without departing from the spirit and scope of our present invention.

We claim:

1. A transmission including a housing, an input shaft extending into said housing, a first shaft in said transmission housing below said input shaft, a gear fixed to said input shaft and having meshing engagement with a gear fixed to said first shaft, a second shaft aligned coaxially of said first shaft, a gear at the end of said first shaft adjacent said second shaft, a gear at the end of said second shaft adjacent said first shaft, a first planet carrier arranged concentrically about said gears at the adjacent ends of said first and second shafts, first compound planet pinion means carried by said first planet carrier and having first and second pinion portions with the first pinion portions meshing with the gear on said first shaft, second planet pinion means having pinion portions meshing with said second pinion portions of said first compound planet pinion means and meshing with the gear on said second shaft, fluid actuated clutch means for clutching said first planet carrier to said second shaft for effecting direct drive between said first and second shafts, brake means for braking said first planet carrier against rotation for effecting reverse drive between said first and second shafts, a third shaft lying below said second shaft, selectively operable change speed gear means between said second and third shafts, an output shaft lying below said third shaft, and selectively operable change speed gear means between said third shaft and said output shaft.

2. A transmission including a housing, a first shaft in said transmission housing, a second shaft aligned coaxially of said first shaft, selectively operable forward and reverse drive gear means between said first and second shafts, a third shaft aligned coaxially of said second shaft, a gear at the end of said second shaft adjacent said third shaft, a gear at the end of said third shaft adjacent said second shaft, a planet carrier arranged concentrically about said gears at the adjacent ends of said second and third shafts, planet pinion means carried by said planet carrier and having meshing engagement with said gears at the adjacent ends of said second and third shafts, said last named planet pinion means having meshing engagement with a ring gear journaled on said second shaft, fluid actuated clutch means for clutching said planet carrier to said third shaft for effecting one drive range between said second shaft and said ring gear, brake means for braking said planet carrier against rotation for effecting a second drive range between said second shaft and said ring gear, brake means for braking said third shaft against rotation for effecting a third drive range between said second shaft and said ring gear, a fourth shaft lying below said second shaft, gear means between said ring gear and said fourth shaft, an output shaft lying below said fourth shaft, and selectively operable change speed gear means between said fourth shaft and said output shaft.

3. A transmission including a housing, an input shaft extending into said housing, a first shaft in said transmission housing below said input shaft, a gear fixed to said input shaft and having meshing engagement with a gear fixed to said first shaft, a second shaft aligned coaxially of said first shaft, a gear at the end of said first shaft adjacent said second shaft, a gear at the end of said second shaft adjacent said first shaft, a first planet carrier arranged concentrically about said gears at the adjacent ends of said first and second shafts, first compound planet pinion means carried by said first planet carrier and having first and second pinion portions with the first pinion portions meshing with the gear on said first shaft, second planet pinion means having pinion portions meshing with said second pinion portions of said first compound planet pinion means and meshing with the gear on said second shaft, fluid actuated clutch means for clutching said first planet carrier to said second shaft for effecting direct drive between said first and second shafts, brake means for braking said first planet carrier against rotation for effecting reverse drive between said first and second shafts, a third shaft aligned coaxially of said second shaft, a gear at the end of said second shaft adjacent said third shaft, a gear at the end of said third shaft adjacent said second shaft, a second planet carrier arranged concentrically about said gears at the adjacent ends of said second and third shafts, planet pinion means carried by said second planet carrier and having meshing engagement with said gears at the adjacent ends of said second and third shafts, said last named planet pinion means having meshing engagement with a ring gear journaled on said second shaft, fluid actuated clutch means for clutching said second planet carrier to said third shaft for effecting one drive range between said second shaft and said ring gear, brake means for braking said second planet carrier against rotation for effecting a second drive range between said second shaft and said ring gear, brake means for braking said third shaft against rotation for effecting a third drive range between said second shaft and said ring gear, a fourth shaft lying below said second shaft, gear means between said ring gear and said fourth shaft, an output shaft lying below said fourth shaft, and selectively operable speed gear means between said fourth shaft and said output shaft.

4. A transmission including a housing, an input shaft extending into said housing, a first shaft in said transmission housing below said input shaft, a gear fixed to said input shaft and having meshing engagement with a gear fixed to said first shaft, a second shaft aligned coaxially of said first shaft, a gear at the end of said first shaft adjacent said second shaft, a gear at the end of said second shaft adjacent said first shaft, a first planet carrier arranged concentrically about said gears at the adjacent ends of said first and second shafts, first compound planet pinion means carried by said first planet carrier and having first and second pinion portions with the first pinion portions meshing with the gear on said first shaft, second planet pinion means having pinion portions meshing with said second pinion portions of said first compound planet pinion means and meshing with the gear on said second shaft, fluid actuated clutch means for clutching said first planet carrier to said second shaft for effecting direct drive between said first and second shafts, brake means for braking said first planet carrier against rotation for effecting reverse drive between said first and second shafts, a third shaft lying below said second shaft, gear means between said second shaft and said third shaft including a first gear secured on said third shaft, an output shaft lying below said third shaft, first, second, third, and fourth axially spaced gears rotatably mounted on said output shaft, said first rotatable gear having meshing engagement with said first gear on said third shaft, a second gear on said third shaft having meshing engagement with said third rotatable gear, a third gear on said third shaft having meshing engagement with said fourth rotatable gear, a lay shaft, first and second gears non-rotatable relative to each other on said lay shaft, a fourth gear on said third shaft having meshing engagement with said first gear on said lay shaft, said second gear on said lay shaft having meshing engagement with said rotatable gear, a first clutch collar member mounted concentrically about said output shaft intermediate said first and second rotatable gears, said first clutch collar member being adapted to selectively clutch either said first or second rotatable gear to said output shaft for effecting either one of two drive ratios between said third shaft and said output shaft, a second clutch collar member mounted concentrically about said output shaft intermediate said third and fourth rotatable gears, said second clutch collar member being adapted to selectively clutch either said third or fourth rotatable gear to said output shaft for effecting one of two additional drive ratios between said third shaft and said output shaft, and a drive pinion at the end of said output shaft.

5. A transmission including a housing, a first shaft in said transmission housing, a second shaft aligned coaxially of said first shaft, selectively operable forward and reverse drive gear means between said first and second shafts, a third shaft aligned coaxially of said second shaft, a gear at the end of said second shaft adjacent said third shaft, a gear at the end of said third shaft adjacent said second shaft, a planet carrier arranged concentrically about said gears at the adjacent ends of said second and third shafts, planet pinion means carried by said planet carrier and having meshing engagement with said gears at the adjacent ends of said second and third shafts, said last named planet pinion means having meshing engagement with a ring gear journaled on said second shaft, fluid actuated clutch means for clutching said planet carrier to said third shaft for effecting one drive range between said second shaft and said ring gear, brake means for braking said planet carrier against rotation for effecting a second drive range between said second shaft and said ring gear, brake means for braking said third shaft against rotation for effecting a third drive range between said second shaft and said ring gear, a gear secured to said ring gear, a fourth shaft lying below said second shaft, a first gear secured on said fourth shaft and having meshing engagement with the gear secured to said ring gear, an output shaft lying below said fourth shaft, first, second, third, and fourth axially spaced gears rotatably mounted on said output shaft, said first rotatable gear having meshing engagement with said first gear on said fourth shaft, a second gear on said fourth shaft having meshing engagement with said third rotatable gear, a third gear on said fourth shaft having meshing engagement with said fourth rotatable gear, a lay shaft, first and second gears non-rotatable relative to each other on said lay shaft, a fourth gear on said fourth shaft having meshing engagement with said first gear on said lay shaft, said second gear on said lay shaft having meshing engagement with said second rotatable gear, a first clutch collar member mounted concentrically about said output shaft intermediate said first and second rotatable gears, said first clutch collar member being adapted to selectively clutch either said first or second rotatable gear to said output shaft for effecting either one of two drive ratios between said fourth shaft and said output shaft, a second clutch collar member mounted concentrically about said output shaft intermediate said third and fourth rotatable gears, said second clutch collar member being adapted to selectively clutch either said third or fourth rotatable gear to said output shaft for effecting one of two additional drive ratios between said fourth shaft and said output shaft, and a drive pinion at the end of said output shaft.

6. A transmission including a housing, an input shaft extending into said housing, a first shaft in said transmission housing below said input shaft, a gear fixed to said input shaft and having meshing engagement with a gear fixed to said first shaft, a second shaft aligned coaxially of said first shaft, a gear at the end of said first shaft adjacent said second shaft, a gear at the end of said second shaft adjacent said first shaft, a first planet carrier arranged concentrically about said gears at the adjacent ends of said first and second shafts, first compound planet pinion means carried by said first planet carrier and having first and second pinion portions with the first pinion portions meshing with the gear on said first shaft, second planet pinion means having pinion portions meshing with said second pinion portions of said first compound planet pinion means and meshing with the gear on said second shaft, fluid actuated clutch means for clutching said first planet carrier to said second shaft for effecting direct drive between said first and second shafts, brake means for braking said first planet carrier against rotation for effecting reverse drive between said first and second shafts, a third shaft aligned coaxially of said second shaft, a gear at the end of said second shaft adjacent said third shaft, a gear at the end of said third shaft adjacent said second shaft, a second planet carrier arranged concentrically about said gears at the adjacent ends of said second and third shafts, planet pinion means carried by said second planet carrier and having meshing engagement with said gears at the adjacent ends of said second and third shafts, said last named planet pinion means having meshing engagement with a ring gear journaled on said second shaft, fluid actuated clutch means for clutching said second planet carrier to said third shaft for effecting one drive range between said second shaft and said ring gear, brake means for braking said second planet carrier against rotation for effecting a second drive range between said second shaft and said ring gear, brake means for braking said third shaft against rotation for effecting a third drive range between said second shaft and said ring gear, a gear secured to said ring gear, a fourth shaft lying below said second shaft, a first gear secured on said fourth shaft and having meshing engagement with the gear secured to said ring gear, an output shaft lying below said fourth shaft, first, second, third, and fourth axially spaced gears rotatably mounted on said output shaft, said first rotatable gear having meshing engagement with said first gear on said fourth shaft, a second gear on said fourth shaft having meshing engagement with said third rotatable gear, a third gear on said fourth shaft having meshing engagement with said fourth rotatable gear, a lay shaft, first and second gears non-rotatable relative to each other on said lay shaft, a fourth gear on said fourth shaft having meshing engagement with said first gear on said lay shaft, said second gear on said lay shaft having meshing engagement with said second rotatable gear, a first clutch collar member mounted concentrically about said output shaft intermediate said first and second rotatable gears, said first clutch collar member being adapted to selectively clutch either said first or second rotatable gear to said output shaft for effecting either one of two drive ratios between said fourth shaft and said output shaft, a second clutch collar member mounted concentrically about said output shaft intermediate said third and fourth rotatable gears, said second clutch collar member being adapted to selectively clutch either said third or fourth rotatable gear to said output shaft for effecting one of two additional drive ratios between said fourth shaft and said output shaft, and a drive pinion at the end of the said output shaft.

7. A transmission including a housing comprising a forward portion, an intermediate portion, and a rear portion, said transmission housing portions being detachably secured together, an input shaft extending into said forward housing portion, a first shaft extending through said forward housing portion and into said intermediate housing portion, gear means between said input shaft and said first shaft and lying within the confines of said forward housing portion, a second shaft aligned coaxially of said first shaft and extending between said intermediate and rear housing portions, selectively operable forward and reverse drive gear means between said first and second shafts and lying within the confines of said intermediate housing portion, a third shaft aligned coaxially of said second shaft and lying within the confines of said rear housing portion, a gear at the end of said second shaft within said rear housing portion, a gear at the end of said third shaft adjacent said second shaft, a planet carrier arranged concentrically about said gears within said rear housing portion, planet pinion means carried by said planet carrier and having meshing engagement with said gears within said rear housing portion, a sleeve member journaled on said second shaft within said intermediate housing portion, said sleeve member projecting into said rear housing portion and having a ring gear at the end thereof, said planet pinion means having meshing engagement with said ring gear, fluid actuated clutch means within said rear housing portion for clutching said planet carrier to said third shaft for effecting one drive range between said second shaft and said ring gear, brake means within said rear housing portion for braking said planet carrier against rotation for effecting a second drive range between said second shaft and said ring gear, brake means within said rear housing portion for braking said third shaft against rotation for effecting a third drive range between said second shaft and said ring gear, a fourth shaft lying below said second shaft and extending through said forward and intermediate housing portions, gear means between said ring gear sleeve and said fourth shaft within the confines of said intermediate housing portion, an output shaft lying below said fourth shaft and extending through said forward and intermediate housing portions, and selectively operable change speed gear means between said fourth shaft and said output shaft and lying within the confines of said forward and intermediate housing portions.

8. A transmission including a housing comprising a forward portion, an intermediate portion, and a rear portion, said transmission housing portions being detachably secured together, an input shaft extending into said forward housing portion, a first shaft extending through said forward housing portion and into said intermediate housing portion, a gear fixed to said input shaft within said forward housing portion and having meshing engagement with a gear fixed to said first shaft within said forward housing portion, a second shaft aligned coaxially of said first shaft and extending between said intermediate and rear housing portions, a gear at the end of said first shaft within said intermediate housing portion, a gear at the end of said second shaft adjacent said first shaft, a first planet carrier arranged concentrically about said gears at the adjacent ends of said first and second shafts, first compound planet pinion means carried by said first planet carrier and having first and second pinion portions with the first pinion portions meshing with the gear on said first shaft, second planet pinion means having pinion portions meshing with said second pinion portions of said first compound planet pinion means and meshing with the gear on said second shaft, fluid actuated clutch means within said intermediate housing portion for clutching said first planet carrier to said second shaft for effecting direct drive between said first and second shafts, brake means within said intermediate housing portion for braking said first planet carrier against rotation for effecting reverse drive between said first and second shafts, a third shaft aligned coaxially of said second shaft and lying within the confines of said rear housing portion, a gear at the end of said second shaft within said rear housing portion, a gear at the end of said third shaft adjacent said second shaft, a second planet carrier arranged concentrically about said gears within said rear housing portion, planet pinion means carried by said second planet carrier and having meshing engagement with said gears within said rear housing portion, a sleeve member journaled on said second shaft within said intermediate housing portion, said sleeve member projecting into said rear housing portion and having a ring gear at the end thereof, said planet pinion means having meshing engagement with said ring gear, fluid actuated clutch means within said rear housing portion for clutching said second planet carrier to said third shaft for effecting one drive range between said second shaft and said ring gear, brake means within said rear housing portion for braking said second planet carrier against rotation for effecting a second drive range between said second shaft and said ring gear, brake means within said rear housing portion for braking said third shaft against rotation for effecting a third drive range between said second shaft and said ring gear, a gear fixed to said ring gear sleeve, a fourth shaft lying below said second shaft and extending through said forward and intermediate housing portions, a first gear secured on said fourth shaft within said intermediate housing portion and having meshing engagement with the gear on said ring gear sleeve, an output shaft lying below said fourth shaft and extending through said forward and intermediate housing portions, first, second, third, and fourth axially spaced gears rotatably mounted on said output shaft within the confines of said forward and intermediate housing portions, said first rotatable gear having meshing engagement with said first gear on said fourth shaft, a second gear on said fourth shaft having meshing engagement with said third rotatable gear, a third gear on said fourth shaft having meshing engagement with said fourth rotatable gear, a lay shaft, first and second gears non-rotatable relative to each other on said lay shaft, a fourth gear on said fourth shaft having meshing engagement with said first gear on said lay shaft, said second gear on said lay shaft having meshing engagement with said second rotatable gear, a first clutch collar member mounted concentrically about said output shaft intermediate said first and second rotatable gears, said first clutch collar member being adapted to selectively clutch either said first or second rotatable gear to said output shaft for effecting either one of two drive ratios between said fourth shaft and said output shaft, a second clutch collar member mounted concentrically about said output shaft intermediate said third and fourth rotatable gears, said second clutch collar member being adapted to selectively clutch either said third or fourth rotatable gears to said output shaft for effecting one of two additional drive ratios between said fourth shaft and said output shaft, and a drive pinion at the end of said output shaft outwardly of said forward housing portion.

9. The combination of a first shaft, a second shaft arranged coaxial of said first shaft, a gear fixed to the end of said first shaft adjacent said second shaft, a gear fixed to the end of said second shaft adjacent said first shaft, a planet carrier arranged concentrically about said first and second shafts and including an axially extending inner clutch hub having external straight splines, compound planet pinions carried by said planet carrier and having first pinion portions which mesh with the gear on said second shaft, planet pinions carried by said planet carrier and meshing with the gear on said first shaft and the second pinion portions of said compound planet pinions, a sleeve member journaled about said first shaft, a ring gear at the end of said sleeve member having meshing engagement with the second pinion portions of said compound planet pinions, an outer axially extending clutch hub radially spaced from the inner clutch hub of said planet carrier and having internal straight splines, said outer clutch hub being secured to a radial flange mounted on said second shaft, first clutch discs mounted for axial movement on the splines of said inner clutch hub, second clutch discs mounted for axial movement on the splines of said outer clutch hub and arranged alternately relative to said first clutch discs, a fluid actuated piston disposed at one end of the clutch discs for selectively forcing said first and second clutch discs into engagement whereby said planet carrier is clutched to said second shaft and one drive ratio is effected between said first shaft and said sleeve member, a first brake drum secured to said planet carrier and overlying said clutch discs, a first brake band adapted to be disposed selectively in braking engagement with said first brake drum for braking said planet carrier against rotation whereby a second drive ratio is effected between said first shaft and said sleeve member, a second brake drum overlying said piston and secured to said radial flange mounted on said second shaft, and a second brake band adapted to be disposed selectively in braking engagement with said second brake drum for braking said second shaft against rotation whereby a third drive ratio is effected between said first shaft and said sleeve member.

References Cited in the file of this patent

UNITED STATES PATENTS

| Number | Name | Date |
|---|---|---|
| 2,123,769 | Cotal | July 12, 1938 |
| 2,134,109 | Eckert | Oct. 25, 1938 |
| 2,288,206 | Pierpont | June 30, 1942 |
| 2,314,833 | Keese | Mar. 23, 1943 |
| 2,341,756 | Avila | Feb. 15, 1944 |
| 2,459,705 | Julien | Jan. 18, 1949 |
| 2,488,756 | Baker | Nov. 22, 1949 |
| 2,494,505 | Bouchard | Jan. 10, 1950 |

FOREIGN PATENTS

| Number | Country | Date |
|---|---|---|
| 427,879 | Great Britain | Apr. 25, 1935 |
| 626,019 | Great Britain | July 7, 1949 |
| 343,203 | Germany | Sept. 10, 1920 |
| 403,871 | Italy | May 11, 1943 |
| 929,571 | France | July 15, 1947 |

OTHER REFERENCES

Publication, Automotive Industries, July 15, 1950.